(12) United States Patent
Lee et al.

(10) Patent No.: US 11,256,020 B1
(45) Date of Patent: Feb. 22, 2022

(54) LIGHT EMITTING STRUCTURE

(71) Applicants: Chern-Jiann Lee, Los Altos, CA (US); Chih-Yu Fan, New Taipei (TW); Pu-Gang Fan, New Taipei (TW)

(72) Inventors: Chern-Jiann Lee, Los Altos, CA (US); Chih-Yu Fan, New Taipei (TW); Pu-Gang Fan, New Taipei (TW)

( * ) Notice: Subject to any disclaimer, the term of this patent is extended or adjusted under 35 U.S.C. 154(b) by 0 days.

(21) Appl. No.: 17/237,999

(22) Filed: Apr. 22, 2021

(51) Int. Cl.
*F21V 8/00* (2006.01)
*F21V 5/04* (2006.01)
*F21Y 115/10* (2016.01)

(52) U.S. Cl.
CPC ............ *G02B 6/0045* (2013.01); *F21V 5/045* (2013.01); *G02B 6/0051* (2013.01); *G02B 6/0053* (2013.01); *G02B 6/0055* (2013.01); *G02B 6/0073* (2013.01); *G02B 6/0078* (2013.01); *F21Y 2115/10* (2016.08)

(58) Field of Classification Search
CPC .. G02B 6/0045; G02B 6/0051; G02B 6/0053; G02B 6/0055; G02B 6/0073; G02B 6/0078; F21V 5/045; F21Y 2115/10
See application file for complete search history.

(56) References Cited

U.S. PATENT DOCUMENTS

| | | | | |
|---|---|---|---|---|
| 11,150,395 | B2* | 10/2021 | Watanabe | G02B 6/0036 |
| 2019/0324193 | A1* | 10/2019 | Crompvoets | G02B 6/0073 |
| 2021/0270445 | A1* | 9/2021 | Imada | F21V 9/30 |

\* cited by examiner

*Primary Examiner* — Mary Ellen Bowman
(74) *Attorney, Agent, or Firm* — Sinorica, LLC

(57) ABSTRACT

A light emitting structure has a substrate, a divider, a light guide element and a light emitting element. The divider is connected with the substrate and erected from the substrate. The light guide element is connected with the divider. The divider is positioned in between the substrate and the light guide element. A chamber is delineated by the substrate, the divider and the light guide element. The light emitting element is mounted onto the substrate, surrounded by the divider, accommodated within the chamber and transparent. The light guide element has an external surface, an internal surface and a convex section and/or a concave section. The external surface and the internal surface are oppositely positioned to each other. The external surface faces away from the substrate. The internal surface faces towards the substrate. The convex section and/or the concave section is formed on the external surface and/or the internal surface.

39 Claims, 13 Drawing Sheets
(7 of 13 Drawing Sheet(s) Filed in Color)

LIGHT EMITTING STRUCTURE

FIELD OF THE INVENTION

The present disclosure relates generally to a light emitting module. More specifically, the present disclosure describes a light emitting structure.

BACKGROUND OF THE INVENTION

The existing design of LED (Light Emitting Diode) lens used in direct back-light unit's local LED area element is mostly in ball/round shape, so that it is difficult to distribute/deliver (such as diffuse, diverge, transmit, scatter, or reflect) light evenly in each of many repeating, rectangle "LED light guiding matrix element." Uneven light uniformity (also called MURA effect) between many different small local dimming areas/blocks is caused by each LED luminous variation, LED driver and electrical circuits accuracy tolerance, and optical films/plates' uniformity skew, as well secondary optical lighting non-uniformity. Light leaking effect (or check-board) is commonly seen crossing the boundary of each local dimming area/block (LED light guiding matrix element), which interfere the neighboring local dimming areas/blocks. This effect is especially worse during HDR (High Dynamic Range) mode. Uneven light effect at the four edge sides of the backlight module is caused by the light reflection around the backlight module's four side edges (top, bottom, left, right). Uneven light effect at the four corners of the backlight unit is caused by the light reflection around the unit's corner edges. LED light waste is either lost during bouncing inside light-guide plate, or not fully reflecting out of local area matrix element. The invention is aimed to resolve the above problems in the existing design of LED direct back-light unit.

BRIEF DESCRIPTION OF THE DRAWINGS

The patent or application file contains at least one drawing executed in color. Copies of this patent or patent application with color drawing(s) will be provided by the Office upon request and payment of the necessary fee.

The accompanying drawings, which are incorporated in and constitute a part of this disclosure, illustrate various embodiments of the present disclosure.

DETAIL DESCRIPTIONS OF THE INVENTION

Figure 1:
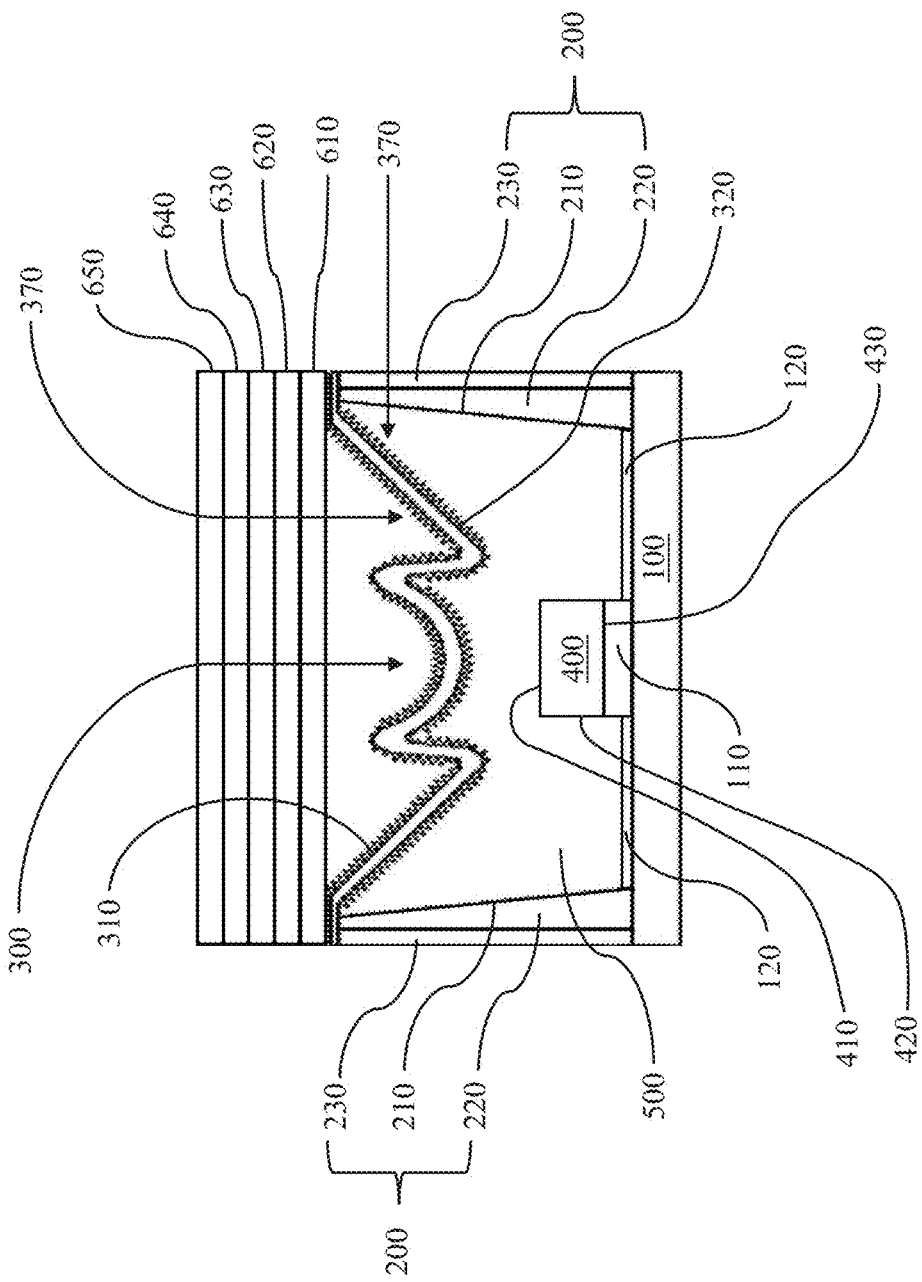
FIG. 1 is a cross-sectional view illustrating a light emitting structure of a light emitting module according to a first embodiment of the present invention.

As a preliminary matter, it will readily be understood by one having ordinary skill in the relevant art that the present disclosure has broad utility and application. As should be understood, any embodiment may incorporate only one or a plurality of the disclosed aspects of the disclosure and may further incorporate only one or a plurality of the disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

All illustrations of the drawings are for the purpose of describing selected versions of the present invention and are not intended to limit the scope of the present invention.

The present invention describes a plurality of light emitting structures (1, 1'). Each of the plurality of light emitting structures (1, 1') is has a substantial cubic shape. The plurality of light emitting structures (1, 1') are arranged in an array and connected with each other so as to form a light emitting module.

First Embodiment: Top Emitting

Figure 2:
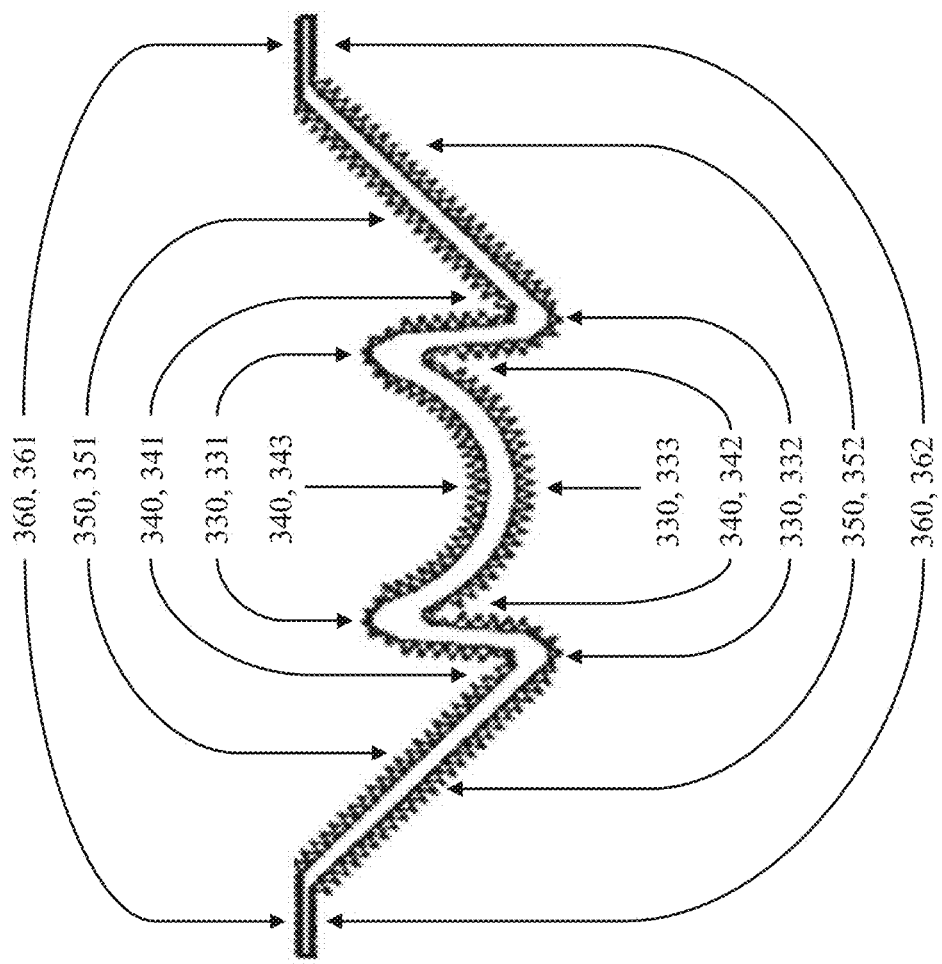
FIG. 2 is a cross-sectional view illustrating a light guide element of the light emitting structure of the light emitting module according to the first embodiment of the present invention.
Figure 3:
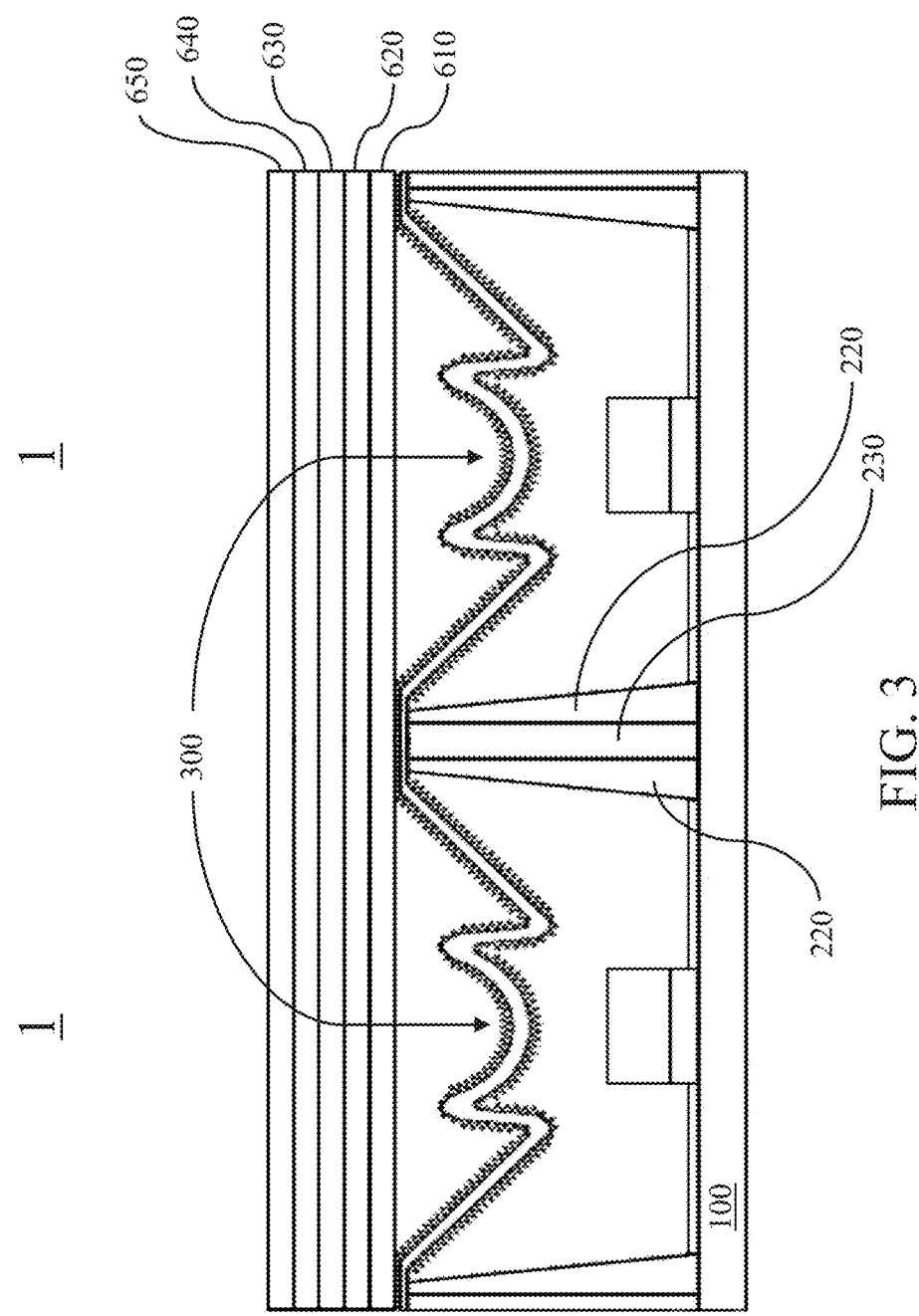
FIG. 3 is a cross-sectional view illustrating any two adjacent light emitting structures of the light emitting module according to the first embodiment of the present invention.

In a first embodiment, please refer to FIGS. 1-3, each light emitting structure (1) comprises a substrate (100), a divider (200), a light guide element (300) and at least one light emitting element (400). The divider (200) is connected with the substrate (100). The divider (200) is erected from the substrate (100). The light guide element (300) is connected with the divider (200,). The divider (200) is positioned in between the substrate (100) and the light guide element (300). A chamber (500) is delineated by the substrate (100), the divider (200) and the light guide element (300). The at least one light emitting element (400) is mounted onto the substrate (100). The at least one light emitting element (400) is surrounded by the divider (200). The at least one light emitting element (400) is accommodated within the chamber (500). The light guide element (300) is transparent. The light guide element (300) comprises an external surface (310), an internal surface (320) and at least one convex section (330) and/or at least one concave section (340). The external surface (310) and the internal surface (320) are oppositely positioned to each other. The external surface (310) faces away from the substrate (100). The internal surface (320) faces towards the substrate (100). The at least one convex section (330) and/or the at least one concave section (340) is formed on the external surface (310) and/or the internal surface (320).

The divider (200) has a horizontal annular profile, such as, but not limited to, rectangle.

In this embodiment, the manufacturing technique for the at least one convex section (330) and/or the at least one concave section (340) might be, but not limited to, hot bending, injection-blow mold, extrusion, hot pressing, injection, or forming.

Preferably, two substrates (100) of any two adjacent light emitting structures (1) among the plurality of light emitting structures (1) are integrated with each other. Alternatively, the substrates (100) of the plurality of light emitting structures (1) are initially in one piece.

Preferably, two light guide elements (300) of any two adjacent light emitting structures (1) among the plurality of light emitting structures (1) are integrated with each other, two external surfaces (310) of any two adjacent light emitting structures (1) among the plurality of light emitting structures (1) are integrated with each other, and two internal surfaces (320) of any two adjacent light emitting structures (1) among the plurality of light emitting structures (1) are integrated with each other. Alternatively, the light guide elements (300) of the plurality of light emitting structures (1) are initially in one piece, the external surfaces (310) of the plurality of light emitting structures (1) are initially in one piece, and the internal surfaces (320) of the plurality of light emitting structures (1) are initially in one piece.

In this embodiment, the light guide element (300) might be made of, but not limited to, glass, plastic, silicon, or other suitable materials capable of guiding, transmitting and conducting light.

In this embodiment, the substrate (100) is a printed circuit board.

In this embodiment, the divider (200) is tapered from the substrate (100) towards the light guide element (300) so as to form an inner lateral slope wall (210) thereof, the inner lateral slope wall (210) is adjacently positioned to the at least one light emitting element (400), and the inner lateral slope wall (210) faces towards the at least one light emitting element (400).

The inner lateral slope wall (210) has a horizontal annular profile, such as, but not limited to, circle, triangle, rectangle, or polygon.

In this embodiment, the divider (200) comprises a lateral light reflecting layer (220), the lateral light reflecting layer (220) is adjacently positioned to the at least one light emitting element (400), and the lateral light reflecting layer (220) faces towards the at least one light emitting element (400). The lateral light reflecting layer (220) is used to reflect light. In one configuration, the divider (200) comprises a lateral light absorbing layer (230), the lateral light absorbing layer (230) is attached to the lateral light reflecting layer (220), the lateral light absorbing layer (230) is oppositely positioned to the at least one light emitting element (400), the lateral light absorbing layer (230) faces away from the at least one light emitting element (400), and the lateral light reflecting layer (220) is positioned in between the lateral light absorbing layer (230) and the at least one light emitting element (400). The lateral light absorbing layer (230) is used to absorb light.

Accordingly, the inner lateral slope wall (210) facilitates the lateral light reflecting layer (220) to reflect light eventually towards the light guide element (300).

Preferably, two lateral light absorbing layers (230) of any two adjacent light emitting structures (1) among the plurality of light emitting structures (1) are integrated with each other or are initially in one piece.

Accordingly, the lateral light absorbing layer (230) prevents light from passing from an arbitrary light emitting structure (1) to an adjacent light emitting structure (1).

In this embodiment, the external surface (310) and/or the internal surface (320) is an uneven surface. The uneven surface is used to evenly scatter light for uniformity. In this embodiment, the light guide element (300) comprises a plurality of blind holes (370), and the plurality of blind holes (370) traverse into the external surface (310) and/or the internal surface (320). The plurality of blind holes (370) are used to evenly scatter light for uniformity. Preferably, the plurality of blind holes (370) are in various size, depth, angle, density.

In this embodiment, the uneven surface or the plurality of blind holes (370) might be formed by using, but not limited to, extrusion, hot pressing, UV/IR printing, nano-imprint lithography, injection, etching, or laser cut.

In this embodiment, a thickness of the light guide element (300) at a periphery of the light guide element (300) is smaller than a thickness of the light guide element (300') at a center of the light guide element (300). Accordingly, it reduces or avoids from light passing from an arbitrary light emitting structure (1) to an adjacent light emitting structure (1).

In this embodiment, in one configuration, the light guide element (300) comprises at least one conical section (350), the at least one convex section (330) and the at least one concave section (340), the at least one conical section (350) comprises a plurality of conical sections (350), the at least one convex section (330) comprises a plurality of convex sections (330), the at least one concave section (340) comprises a plurality of concave sections (340), and the light guide element (300) having a shape of multiple concentric volcano craters or a shape of a speaker drum or a shape of multiple ring waves by the plurality of conical sections (350), the plurality of convex sections (330) and the plurality of concave sections (340) being formed on the external surface (310) and the internal surface (320). In one configuration, the plurality of conical sections (350) comprises a first conical section (351) and a second conical section (352), the plurality of convex sections (330) comprises a first annular convex section (331), a second annular convex section (332) and a central convex section (333), the plurality of concave sections (340) comprises a first annular concave section (341), a central concave section (343) and a second annular concave section (342), the first conical section (351), the first annular concave section (341), the first annular convex section (331) and the central concave section (343) are concentrically and sequentially formed on the external surface (310) from a periphery of the light guide element (300) towards a center of the light guide element (300), the second conical section (352), the second annular convex section (332), the second annular concave section (342) and the central convex section (333) are concentrically and sequentially formed on the internal surface (320) from the periphery of the light guide element (300) towards the center of the light guide element (300), the first conical section (351) and the second conical section (352) are oppositely positioned to each other, the first conical section (351) and the second conical section (352) each is obliquely extended from the periphery of the light guide element (300) towards the center of the light guide element (300), the first annular concave section (341) and the second annular convex section (332) are oppositely positioned to each other, the first annular convex section (331) and the second annular concave section (342) are oppositely positioned to each other, and the central concave section (343) and the central convex section (333) are oppositely positioned to each other. In one configuration, the light guide element (300) comprises at least one substantial flat section (360), the at least one substantial flat section (360) comprises a plurality of substantial flat sections (360), the plurality of substantial flat sections (360) comprises a first substantial flat section (361) and a second substantial flat section (362), the first substantial flat section (361), the first conical section (351), the first annular concave section (341), the first annular convex section (331) and the central concave section (343) are concentrically and sequentially formed on the external surface (310) from the periphery of the light guide element (300) towards the center of the light guide element (300), the second substantial flat section (362), the second conical section (352), the second annular convex section (332), the second annular concave section (342) and the central convex section (333) are concentrically and sequentially formed on the internal surface (320) from the periphery of the light guide element (300) towards the center of the light guide element (300), the first substantial flat section and the second substantial flat section (362) are oppositely positioned to each other, and the second substantial flat section (362) is connected with the divider (200).

The at least one convex section (330), the at least one concave section (340), the at least one conical section (350) and the at least one substantial flat section (360) each has a horizontal annular profile, such as, but not limited to, circle, triangle, rectangle, or polygon.

Preferably, two first substantial flat sections (361) of any two adjacent light emitting structures (1) among the plurality of light emitting structures (1) are integrated with each other or are initially in one piece, and two second substantial flat sections (362) of any two adjacent light emitting structures (1) among the plurality of light emitting structures (1) are integrated with each other or are initially in one piece.

In this embodiment, in one configuration, the light guide element (300) comprises the at least one convex section (330) and the at least one concave section (340), the at least one convex section (330) and the at least one concave section (340) are correspondingly positioned to the at least one light emitting element (400), and the at least one convex section (330) and the at least one concave section (340) are offset from the at least one light emitting element (400).

Accordingly, the shape of the light guide element (300) is designed to change, mix, partially redirect, reflect and scatter light to desired lighting distribution such that the light guide element (300) could balance the light distribution while eliminating the hot-spot or the hollow effect.

In this embodiment, the at least one light emitting element (400) comprises a primary light emitting surface (410) and a mounting surface (430), the primary light emitting surface (410) and the mounting surface (430) are oppositely positioned to each other, the primary light emitting surface (410) faces towards the light guide element (300), and the mounting surface (430) is mounted onto the substrate (100). In one configuration, the at least one light emitting element (400) comprises a secondary light emitting surface (420), the secondary light emitting surface (420) and the primary light emitting surface (410) are adjacently positioned to each other, the secondary light emitting surface (420) and the mounting surface (430) are adjacently positioned to each other, the secondary light emitting surface (420) is positioned in between the primary light emitting surface (410) and the mounting surface (430), and the secondary light emitting surface (420) faces towards the divider (200).

In this embodiment, the at least one light emitting element (400) comprises a plurality of light emitting elements (400).

In this embodiment, the at least one light emitting element (400) is a light emitting diode (LED). In one configuration, the light emitting diode is a top emitting LED; in other words, an amount of light emitted from the secondary light emitting surface (420) is less than an amount of light emitted from the primary light emitting surface (410). For example, the LED might be a white light LED or a blue light LED. Alternatively, the LED might comprise a blue light chip and a light converting material, the light converting material is used to convert blue light from the blue light chip to white light, and the light converting material is a red phosphor.

In this embodiment, the at least one light emitting element (400) is electrically connected with the substrate (100). In one configuration, the light emitting structure (1) comprises at least one electrical node (110), and the at least one light emitting element (400) is mounted onto the substrate (100) via the at least one electrical node (110). In this embodiment, the light emitting structure (1) comprises a bottom light reflecting layer (120), and the bottom light reflecting layer (120) is superposed onto the substrate (100). In one configuration, the bottom light reflecting layer (120) is coated on the substrate (100). In one configuration, the bottom light reflecting layer (120) is accommodated within the chamber (500). The bottom light reflecting layer (120) is used to reflect light. For example, the bottom light reflecting layer (120) might be a white color ink.

In this embodiment, the light emitting structure (1) comprises a first light diffusing film (610), the first light diffusing film (610) is disposed on the light guide element (300), and the light guide element (300) is positioned in between the divider (200) and the first light diffusing film (610). In one configuration, the light emitting structure (1) comprises a first brightness enhancement film (620), the first brightness enhancement film (620) is disposed on the first light diffusing film (610), and the first light diffusing film (610) is positioned in between the light guide element (300) and the first brightness enhancement film (620). In one configuration, the light emitting structure (1) comprises a light converting film (630), the light converting film (630) is disposed on the first brightness enhancement film (620), and the first brightness enhancement film (620) is positioned in between the first light diffusing film (610) and the light converting film (630). In one configuration, the light emitting structure (1) comprises a second light diffusing film (640), the second light diffusing film (640) is disposed on the light converting film (630), and the light converting film (630) is positioned in between the first brightness enhancement film (620) and the second light diffusing film (640). In one configuration, the light emitting structure (1) comprises a second brightness enhancement film (650), the second brightness enhancement film (650) is disposed on the second light diffusing film (640), and the second light diffusing film (640) is positioned in between the light converting film (630) and the second brightness enhancement film (650). The first light diffusing film (610) and the second light diffusing film (640) are used to enhance light mixing effect and to increase light brightness. The first brightness enhancement film (620) and the second brightness enhancement film (650) are used to reduce the width of the wavelength of light and to increase light brightness. The light converting film (630) is used to convert the wavelength of light and generate required color of light.

For example, the LED might be a blue light LED, the light converting film (630) might comprise a light converting material, the light converting material is used to convert blue light from the blue light LED to white light, and the light converting material is a green quantum dot.

Preferably, two first light diffusing films (610) of any two adjacent light emitting structures (1) among the plurality of light emitting structures (1) are integrated with each other. Alternatively, the light diffusing films (610) of the plurality of light emitting structures (1) are initially in one piece.

Preferably, two first brightness enhancement films (620) of any two adjacent light emitting structures (1) among the plurality of light emitting structures (1) are integrated with each other. Alternatively, the first brightness enhancement films (620) of the plurality of light emitting structures (1) are initially in one piece.

Preferably, two light converting films (630) of any two adjacent light emitting structures (1) among the plurality of light emitting structures (1) are integrated with each other. Alternatively, the light converting films (630) of the plurality of light emitting structures (1) are initially in one piece.

Preferably, two second light diffusing films (640) of any two adjacent light emitting structures (1) among the plurality of light emitting structures (1) are integrated with each other. Alternatively, the second light diffusing films (640) of the plurality of light emitting structures (1) are initially in one piece.

Preferably, two second brightness enhancement films (650) of any two adjacent light emitting structures (1) among the plurality of light emitting structures (1) are integrated with each other. Alternatively, the second brightness enhancement films (650) of the plurality of light emitting structures (1) are initially in one piece.

Second Embodiment: Side Emitting

Figure 4:
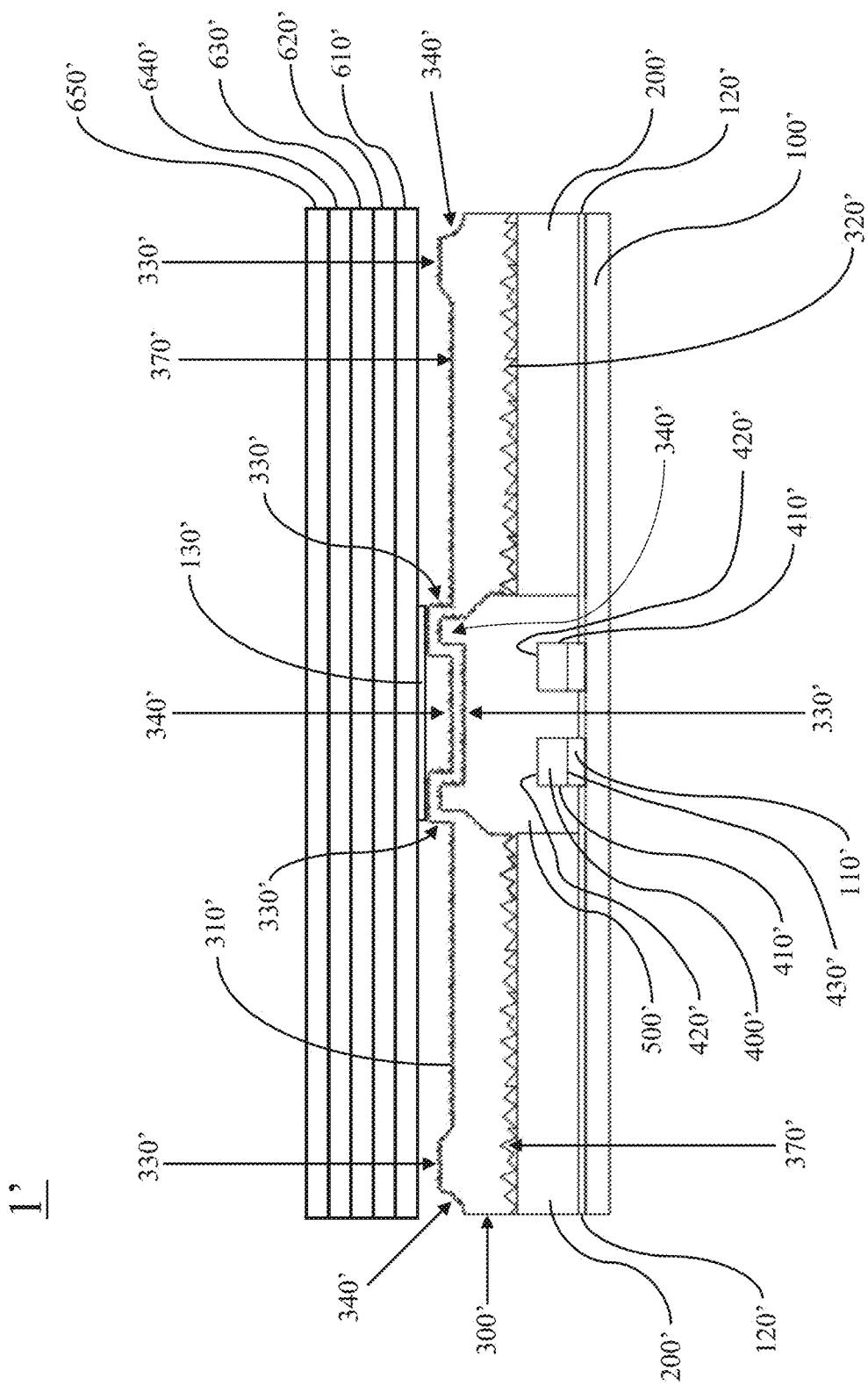
FIG. 4 is a cross-sectional view illustrating a light emitting structure of a light emitting module in a first variation according to a second embodiment of the present invention.
Figure 5:
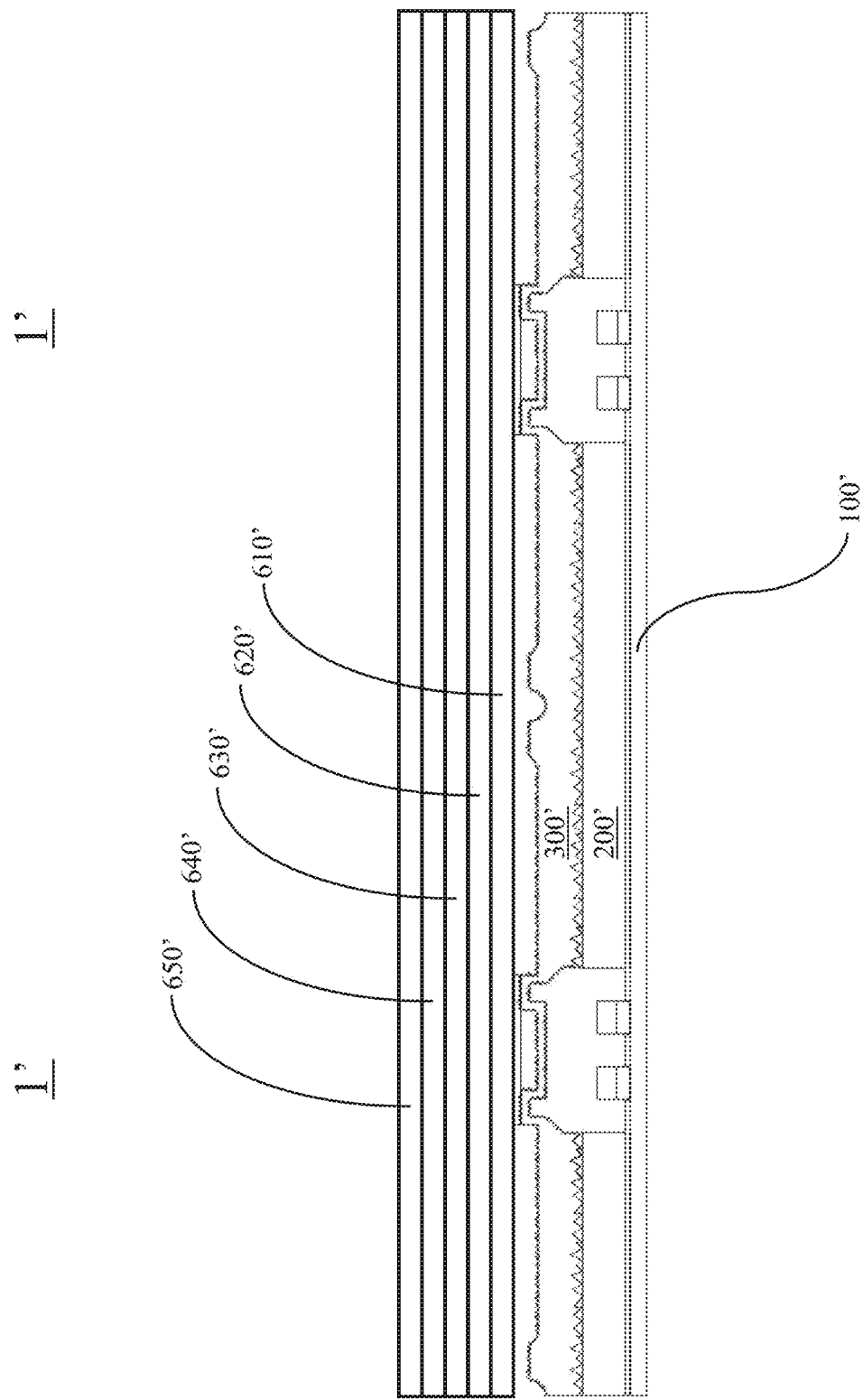
FIG. 5 is a cross-sectional view illustrating any two adjacent light emitting structures of the light emitting module in the first variation according to the second embodiment of the present invention.
Figure 6:
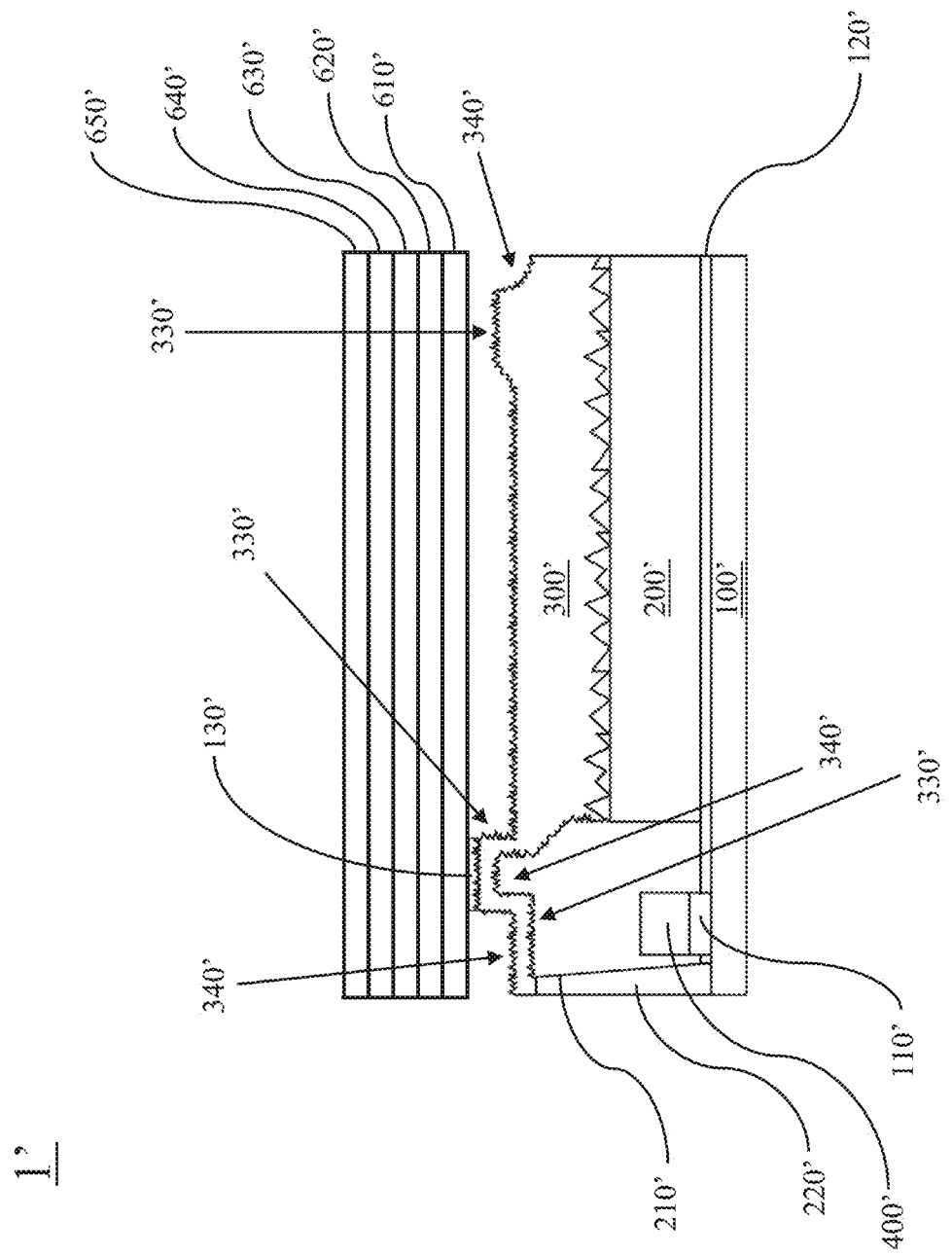
FIG. 6 is a cross-sectional view illustrating the light emitting structure of the light emitting module in a second variation according to the second embodiment of the present invention.

In a second embodiment, please refer to FIGS. 4-6, each light emitting structure (1') comprises a substrate (100'), a divider (200'), a light guide element (300') and at least one light emitting element (400'). The divider (200') is connected with the substrate (100'). The divider (200') is erected from the substrate (100'). The light guide element (300') is connected with the divider (200'). The divider (200') is positioned in between the substrate (100') and the light guide element (300'). A chamber (500') is delineated by the substrate (100'), the divider (200') and the light guide element (300'). The at least one light emitting element (400') is mounted onto the substrate (100'). The at least one light emitting element (400') is surrounded by the divider (200'). The at least one light emitting element (400') is accommodated within the chamber (500'). The light guide element (300') is transparent. The light guide element (300') comprises an external surface (310'), an internal surface (320') and at least one convex section (330') and/or at least one concave section (340'). The external surface (310') and the internal surface (320') are oppositely positioned to each other. The external surface (310') faces away from the substrate (100'). The internal surface (320') faces towards the substrate (100'). The at least one convex section (330') and/or the at least one concave section (340') is formed on the external surface (310') and/or the internal surface (320').

The divider (200') has a horizontal annular profile, such as, but not limited to, rectangle.

In this embodiment, the manufacturing technique for the at least one convex section (330') and/or the at least one concave section (340') might be, but not limited to, hot bending, injection-blow mold, extrusion, hot pressing, injection, or forming.

Preferably, two substrates (100') of any two adjacent light emitting structures (1') among the plurality of light emitting structures (1') are integrated with each other. Alternatively, the substrates (100') of the plurality of light emitting structures (1') are initially in one piece.

Preferably, two dividers (200') of any two adjacent light emitting structures (1') among the plurality of light emitting structures (1') are integrated with each other. Alternatively, the dividers (200') of the plurality of light emitting structures (1') are initially in one piece.

Preferably, two light guide elements (300') of any two adjacent light emitting structures (1') among the plurality of light emitting structures (1') are integrated with each other, two external surfaces (310') of any two adjacent light emitting structures (1') among the plurality of light emitting structures (1') are integrated with each other, and two internal surfaces (320') of any two adjacent light emitting structures (1') among the plurality of light emitting structures (1') are integrated with each other. Alternatively, the light guide elements (300') of the plurality of light emitting structures (1') are initially in one piece, the external surfaces (310') of the plurality of light emitting structures (1') are initially in one piece, and the internal surfaces (320') of the plurality of light emitting structures (1') are initially in one piece.

In this embodiment, the light guide element (300') might be made of, but not limited to, glass, plastic, silicon, or other suitable materials capable of guiding and conducting light.

In this embodiment, the substrate (100') is a printed circuit board.

In this embodiment, in a first variation, the divider (200') is transparent.

In this embodiment, the divider (200') might be made of, but not limited to, glass, plastic, silicon, or other suitable materials capable of guiding, transmitting and conducting light.

In this embodiment, the light guide element (300') is integrated with the divider (200'). Alternatively, the light guide element (300') and the divider (200') are initially in one piece.

In this embodiment, in a second variation, for outermost light emitting structure(s) (1') among the plurality of light emitting structures (1'), which is similar to non-outermost light emitting structure(s) (1') in a first variation, at least one portion of the divider (200') is transparent, at least one another portion of the divider (200') is tapered from the substrate (100') towards the light guide element (300') so as to form an inner lateral slope wall (210') thereof, the inner lateral slope wall (210') is adjacently positioned to the at least one light emitting element (400'), the inner lateral slope wall (210') faces towards the at least one light emitting element (400'), the divider (200') comprises a lateral light reflecting layer (220'), the lateral light reflecting layer (220') is adjacently positioned to the at least one light emitting element (400'), and the lateral light reflecting layer (220') faces towards the at least one light emitting element (400'). The lateral light reflecting layer (220') is used to reflect light.

Accordingly, the inner lateral slope wall (210') facilitates the lateral light reflecting layer (220') to reflect light eventually towards the light guide element (300').

In this embodiment, the external surface (310') and/or the internal surface (320') is an uneven surface. The uneven surface is used to evenly scatter light for uniformity.

In this embodiment, the light guide element (300') comprises a plurality of blind holes (370'), and the plurality of blind holes (370') traverses into the external surface (310') and/or the internal surface (320'). The plurality of blind holes (370') are used to evenly scatter light for uniformity. Preferably, the plurality of blind holes (370') are in various size, depth, angle, density.

In this embodiment, the uneven surface or the plurality of blind holes (370') might be formed by using, but not limited to, extrusion, hot pressing, UV/IR printing, nano-imprint lithography, injection, etching, or laser cut.

In this embodiment, the light guide element (300') comprises the at least one convex section (330') or the at least one concave section (340'), and the at least one convex section (330') or the at least one concave section (340') is formed on the external surface (310') or the internal surface (320'). In one configuration, the at least one convex section (330') or the at least one concave section (340') is correspondingly positioned to the divider (200'), and the at least one convex section (330') or the at least one concave section (340') is offset from the divider (200'). In one configuration, the at least one convex section (330') or the at least one concave section (340') is correspondingly positioned to the at least one light emitting element (400'), and the at least one convex section (330') or the at least one concave section (340') is offset from the at least one light emitting element (400'). In one configuration, the light emitting structure (1') comprises a coating (130'), and the coating (130') is disposed on the at least one convex section (330') or the at least one concave section (340'). The coating (130') is used to partially reflect and scatter light.

The at least one convex section (330) and the at least one concave section (340) each has a horizontal annular profile, such as, but not limited to, circle, triangle, rectangle, or polygon.

Accordingly, the shape of the light guide element (300') is designed to change, mix, partially redirect, reflect and scatter light to desired lighting distribution such that the light guide element (300') could balance the light distribution while eliminating the hot-spot or the hollow effect.

Preferably, the at least one convex section (330') or the at least one concave section (340') has a ring wave shape.

In this embodiment, in one configuration, the at least one light emitting element (400') comprises a primary light emitting surface (410') and a mounting surface (430'), the primary light emitting surface (410') and the mounting surface (430') are adjacently positioned to each other, the primary light emitting surface (410') faces towards the divider (200'), and the mounting surface (430') is mounted onto the substrate (100'). In one configuration, the at least one light emitting element (400') comprises a secondary light emitting surface (420'), the secondary light emitting surface (420') and the primary light emitting surface (410') are adjacently positioned to each other, the secondary light emitting surface (420') and the mounting surface (430') are oppositely positioned to each other, and the secondary light emitting surface (420') faces towards the light guide element (300').

In this embodiment, the at least one light emitting element (400') comprises a plurality of light emitting elements (400').

In this embodiment, in one configuration, the at least one light emitting element (400') comprises two light emitting elements (400, 400'), the two light emitting elements (400') each comprises a primary light emitting surface (410') and a mounting surface (430'), the primary light emitting surface (410') and the mounting surface (430') are adjacently positioned to each other, the two primary light emitting surfaces (410') each faces towards the divider (200'), the two primary light emitting surfaces (410') are oriented in two opposite directions, and the two mounting surfaces (430') each is mounted onto the substrate (100').

In this embodiment, the at least one light emitting element (400') is a light emitting diode (LED). In one configuration, the light emitting diode is a side emitting LED; in other words, an amount of light emitted from the secondary light emitting surface (420') is less than an amount of light emitted from the primary light emitting surface (410'). For example, the LED might be a white light LED or a blue light LED. Alternatively, the LED might comprise a blue light chip and a light converting material, the light converting material is used to convert blue light from the blue light chip to white light, and the light converting material is a red phosphor.

In this embodiment, the at least one light emitting element (400') is electrically connected with the substrate (100'). In one configuration, the light emitting structure (1') comprises at least one electrical node (110'), and the at least one light emitting element (400') is mounted onto the substrate (100') via the at least one electrical node (110').

In this embodiment, the light emitting structure (1') comprises a bottom light reflecting layer (120'), and the bottom light reflecting layer (120') is superposed onto the substrate (100'). In one configuration, the bottom light reflecting layer (120') is coated on the substrate (100'). The bottom light reflecting layer (120') is used to reflect light. For example, the bottom light reflecting layer (120') might be a white color ink.

In this embodiment, the light emitting structure (1') comprises a first light diffusing film (610'), the first light diffusing element is disposed on the light guide element (300'), and the light guide element (300') is positioned in between the divider (200') and the first light diffusing element. In one configuration, the light emitting structure (1') comprises a first brightness enhancement film (620'), the first brightness enhancement film (620') is disposed on the first light diffusing film (610'), and the first light diffusing film (610') is positioned in between the light guide element (300') and the first brightness enhancement film (620'). In one configuration, the light emitting structure (1') comprises a light converting film (630'), the light converting film (630') is disposed on the first brightness enhancement film (620'), and the first brightness enhancement film (620') is positioned in between the first light diffusing film (610') and the light converting film (630'). In one configuration, the light emitting structure (1') comprises a second light diffusing film (640'), the second light diffusing element is disposed on the light converting film (630'), and the light converting film (630') is positioned in between the first brightness enhancement film (620') and the second light diffusing element. In one configuration, the light emitting structure (1') comprises a second brightness enhancement film (650'), the second brightness enhancement film (650') is disposed on the second light diffusing film (640'), and the second light diffusing film (640') is positioned in between the light converting film (630') and the second brightness enhancement film (650'). The first light diffusing film (610') and the second light diffusing film (640') are used to enhance light mixing effect and to increase light brightness. The first brightness enhancement film (620') and the second brightness enhancement film (650') are used to reduce the width of the wavelength of light and to increase light brightness. The light converting film (630') is used to convert the wavelength of light and generate required color of light.

For example, the LED might be a blue light LED, the light converting film (630') might comprise a light converting material, the light converting material is used to convert blue light from the blue light LED to white light, and the light converting material is a green quantum dot.

Preferably, two first light diffusing films (610') of any two adjacent light emitting structures (1) among the plurality of light emitting structures (1') are integrated with each other. Alternatively, the first light diffusing films (610') of the plurality of light emitting structures (1') are initially in one piece.

Preferably, two first brightness enhancement films (620') of any two adjacent light emitting structures (1') among the plurality of light emitting structures (1') are integrated with each other. Alternatively, the first brightness enhancement films (620') of the plurality of light emitting structures (1') are initially in one piece.

Preferably, two light converting films (630') of any two adjacent light emitting structures (1') among the plurality of light emitting structures (1') are integrated with each other. Alternatively, the light converting films (630') of the plurality of light emitting structures (1') are initially in one piece.

Preferably, two second light diffusing films (640') of any two adjacent light emitting structures (1') among the plurality of light emitting structures (1') are integrated with each other. Alternatively, the second light diffusing films (640') of the plurality of light emitting structures (1') are initially in one piece.

Preferably, two second brightness enhancement films (650') of any two adjacent light emitting structures (1') among the plurality of light emitting structures (1') are integrated with each other. Alternatively, the second brightness enhancement films (650') of the plurality of light emitting structures (1') are initially in one piece.

The following illustrates the performance and function achieved by this invention.

Figure 7:
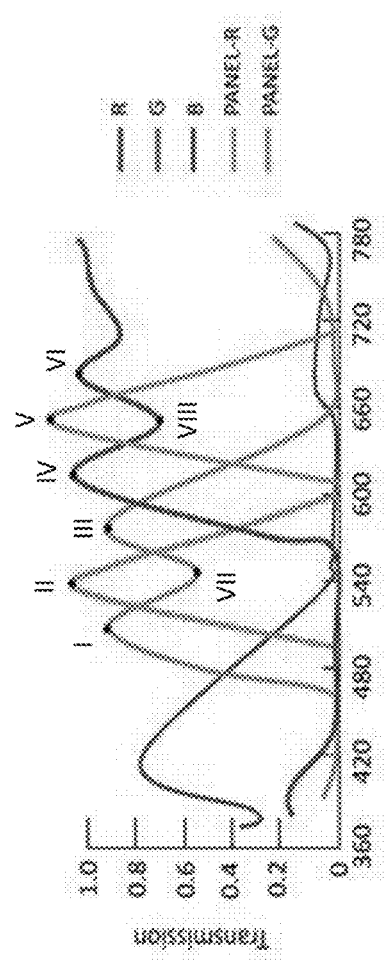
FIG. 7 is a diagram showing five color waves of the present invention.

FIG. 7 is a diagram showing five color waves:

The R G B waves are the compound result from the light conversion material in the light emitting element (400, 400') and the light converting film (630, 630') mentioned above. Where R G are dual (or even multiple) peak waves.

The Panel-R Panel-G are the waves from (can be more than one) color filters in LCD module.

I: This is the first peak of the dual green wave bands, it helps increase the Yellow, Gold color gamut for the green wave peak II.

II: The peak of the single peak green waveform of the color filters in LCD panel, helping to achieve the maximum LCD panel light transmission rate and green color gamut space.

III: This is the second peak of the dual green wave bands, it helps increase the Cyan color gamut for the green wave peak I.

IV: This is the first peak of the dual red wave bands, it helps increase the Magenta color gamut for the red wave peak V.

V: The peak of the single peak red waveform of the color filters in LCD panel, helping to achieve the maximum LCD panel light transmission rate and red color gamut space.

VI: This is the second peak of the dual red wave bands, it helps increase the Yellow, Gold color gamut for wave peak IV.

VII: This is the cross point of the dual peak green waves from light conversion material, it's adjusted to match the green peak of the LCD panel color filter waveform, to achieve:
increase the brightness of the green color;
widen the wave peak points I, II, III color gamut, and reach the BT2020, DCI-P3 spec's green color top point.

VIII: This is the cross point of the dual peak red waves from light conversion material, it's adjusted to match the red peak of the LCD panel color filter waveform, to achieve:
increase the brightness of the red color;
widen the wave peak points IV, V, VI color gamut, and reach the BT2020, DCI-P3 spec's red color top point.

Figure 8:
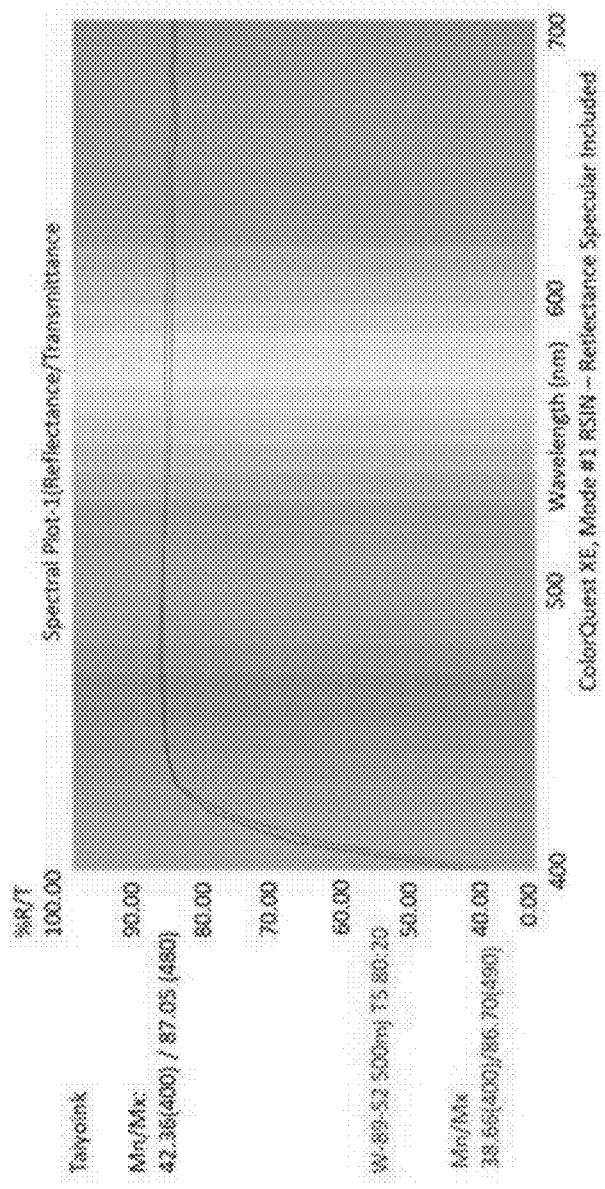
FIG. 8 is a diagram showing the reflection efficiency of a bottom light reflecting layer of the present invention.

FIG. 8 is a diagram showing the reflection efficiency of a bottom light reflecting layer (120, 120'), where:

The black curve is the efficiency rate of the current commonly used reflecting coating material;

The red curve is the efficiency from the patent claimed coating material that can be controlled/adjusted to arrange its wavelength band falling on the range can achieve the maximum reflecting efficiency;

The such reflecting material is designed to control/adjust their best reflecting efficiency for red color band at 520-540 nm range, and green color band at 620-660 nm range, to match the wavelength characteristic of the LCD panel's color filter, in order to maximize the total reflecting efficiency.

Figure 9:
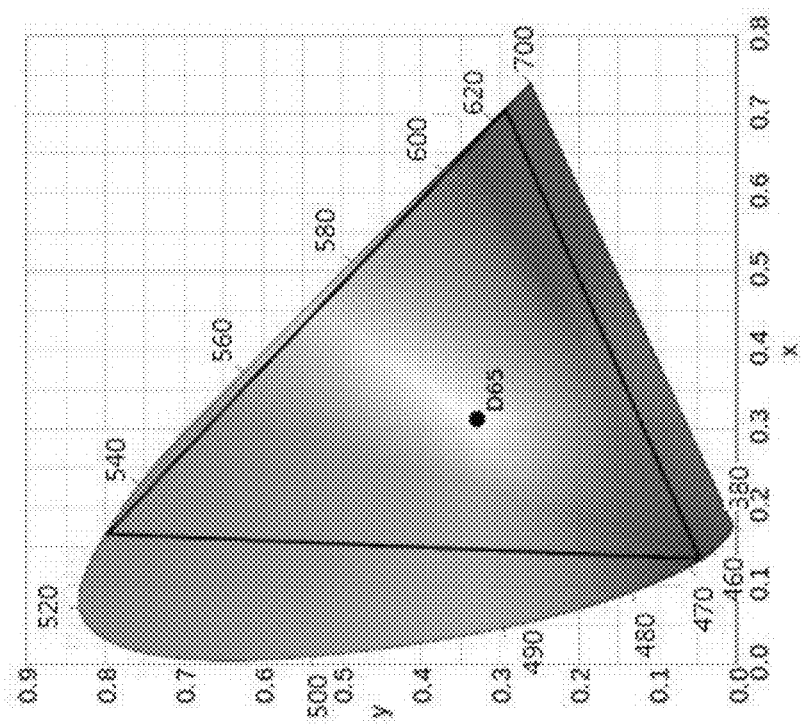
FIG. 9 is a diagram showing color gamut of the present invention.

By combining those light wavelengths resulting from the compound effect of the light converting material in the light emitting element (400, 400'), the light converting film (630, 630') and the bottom light reflecting layer (120, 120'), the final light wavelength can be pulled to add/widen at least one color gamut point in red, green color, thereby increasing the color score, as shown in FIG. 9 which is a diagram showing color gamut of the present invention.

The light wavelength of the light conversion material in the light emitting element (400, 400') might be, but not limited to, 630 nm and 660 nm. The light wavelength of the light conversion material in the light converting film (630, 630') might be, but not limited to, 525 nm and 538 nm. Through controlling and adjusting the two wavelength peaks of the light conversion materials in the light emitting element (400, 400') and the light converting film (630, 630'), one can target their wavelength cross point matching the red light peak wavelength or the green light peak wavelength of color filter (built in LCD panel). Therefore, this design can raise the light brightness, and also increase color gamut. This technique can apply to different optical color conversion films, which may be designed to target the different color filtering targets. The bottom light reflecting layer (120, 120') is designed to increase reflecting efficiency for light wavelength from 630 nm to 660 nm or from 525 nm to 538 nm.

Figure 10:
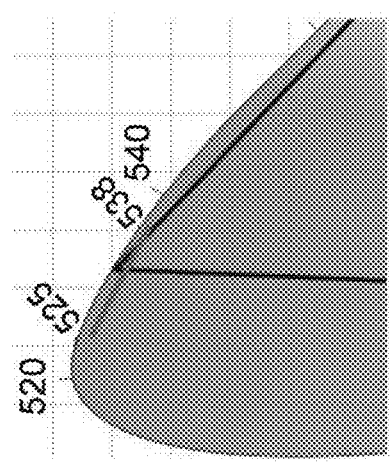
FIG. 10 is a first diagram showing the adjustment of a peak performance wavelength of a reflecting coating material.
Figure 11:
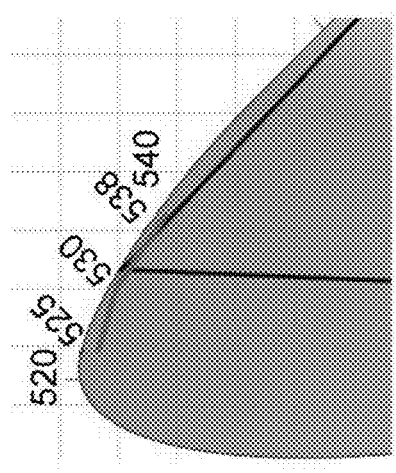
FIG. 11 is second diagram showing the adjustment of the peak performance wavelength of a reflecting coating material.

In FIG. 10 and FIG. 11, the reflecting coating material can be adjusted its peak performance wavelength to let the maximum reflection efficiency's wave band, matching the LCD panel color filter's green peak wave; to increase green color gamut, as these figures show: adding one additional green color point; and pulled it outward to increase green color gamut value (525, 530, 538) vs. the original straight line (525 to 538).

Figure 12:
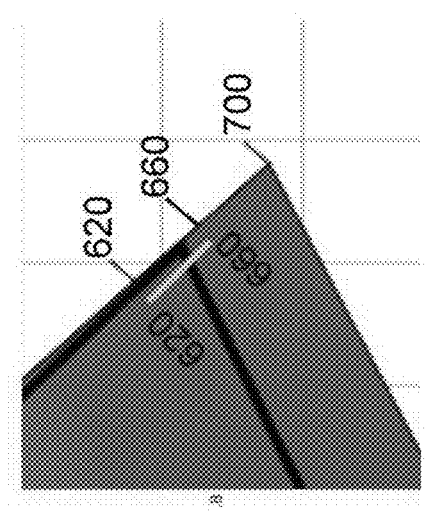
FIG. 12 is a third diagram showing the adjustment of the peak performance wavelength of a reflecting coating material.
Figure 13:
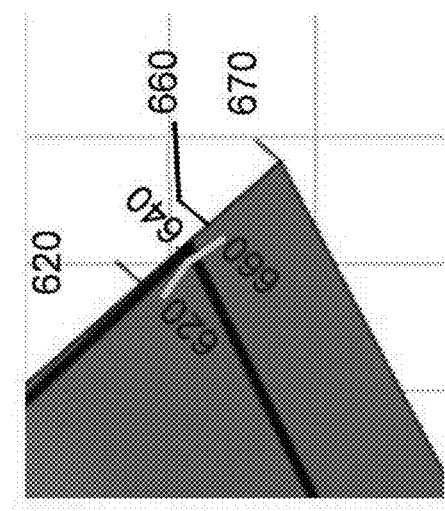
FIG. 13 is a fourth diagram showing the adjustment of the peak performance wavelength of a reflecting coating material.

In FIG. 12 and FIG. 13, the reflecting coating material can be adjusted its peak performance wavelength to let the maximum reflection efficiency's wave band, matching the LCD panel color filter's red peak wave; to increase green color gamut, as these figures show: adding one additional red color point; and pulled it outward to increase red color gamut value (620, 640, 660) vs. the original straight line (620 to 660).

The invention has local dimming function and HDR function, is able to achieve high luminous brightness and high color performance, to efficiently deliver light, to achieve minimum display thickness.

The invention achieves the performance in display industry: high dynamic range (HDR), high color performance, high luminous uniformity, high luminous/lighting efficiency, high power efficiency, high density of local dimming areas/blocks, low MURA effect, minimized module thickness.

Table 1 illustrates the performance achieved by the invention:

TABLE 1

| NICHIA TW + VMI | |
|---|---|
| Open cell and Back-lit | |
| SIZE of OC | 31.5" |
| Resolution | 3840 * 2160 |

TABLE 1-continued

| NICHIA TW + VMI | | |
|---|---|---|
| OC tramiition ratio | 3.2 | |
| Backlit led No. | 2048 | |
| single led vf | 12 | |
| If | 6 mA @ 1600 nit | |
| color of LED | dual color | 40% brighter than QD |
| Total back-lit power | 147.456 w | 100% at 1600 nits |
| Backlit control and TCON | | |
| Areas | 1024 | |
| TCON | 12 Times of standard SPI | |
| frame rate | Auto dymanic to 960 HZMAax. | |
| Timing buffer | Yes | (power saving more) |
| driver on light bar | yes | save power leak |
| back-lit scaning | dot to dot | own patent |
| back-lit resolution | 12 bit at 4096 scale | |
| Power lose in dryer | 1.4/22 = 6% lose in driving Rfv | |
| Driving effeciency | better | |
| HDR PEAK | 1580 nits | |
| SDR | 500 nits | |
| HDR L20/L10 peak | 1489 nits at L10 | |
| L20 HDR + L8OSDR | 80 W | |
| Thermal | 47° C. at TA = 25° C. | |
| HDR L20/L11 dark | 0.04 nits | |
| HDR L20/L12 dark | 0.05 nits | |
| color gamut 1976 overlay | | |
| REC 2020 | 88.6% D93, 85.6 D65 | |
| DCI-P3 | 98.6%, D65 | |
| ADOBE | >100%, D93 and D65 | |
| REC709 | >100%, D93 and D65 | |
| REC709 | >100%, D93 and D65 | |
| Special treament of lit leakage and light spreading cross areas | | |
| Film treatement | yes with light multi-angle dist. | |
| mechanical limiter | Yes and better | |
| on Open cell leakage | better only 8 pixels | |

Although the invention has been explained in relation to its preferred embodiment, it is to be understood that many other possible modifications and variations can be made without departing from the spirit and scope of the invention as hereinafter claimed.

What is claimed is:
1. A light emitting structure comprising:
a substrate;
a divider;
a light guide element;
at least one light emitting element;
the divider being connected with the substrate;
the divider being erected from the substrate;
the light guide element being connected with the divider;
the divider being positioned in between the substrate and the light guide element;
a chamber being delineated by the substrate, the divider and the light guide element;
the at least one light emitting element being mounted onto the substrate;
the at least one light emitting element being surrounded by the divider;
the at least one light emitting element being accommodated within the chamber;
the light guide element being transparent;
the light guide element comprising an external surface, an internal surface and at least one convex section and/or at least one concave section;
the external surface and the internal surface being oppositely positioned to each other;
the external surface facing away from the substrate;
the internal surface facing towards the substrate; and the at least one convex section and/or the at least one concave section being formed on the external surface and/or the internal surface.

2. The light emitting structure as claimed in claim 1 comprising:
at least one portion of the divider being tapered from the substrate towards the light guide element so as to form an inner lateral slope wall thereof;
the inner lateral slope wall being adjacently positioned to the at least one light emitting element; and
the inner lateral slope wall facing towards the at least one light emitting element.

3. The light emitting structure as claimed in claim 1 comprising:
the divider comprising a lateral light reflecting layer;
the lateral light reflecting layer being adjacently positioned to the at least one light emitting element; and
the lateral light reflecting layer facing towards the at least one light emitting element.

4. The light emitting structure as claimed in claim 3 comprising:
the divider comprising a lateral light absorbing layer;
the lateral light absorbing layer being attached to the lateral light reflecting layer;
the lateral light absorbing layer being oppositely positioned to the at least one light emitting element;
the lateral light absorbing layer facing away from the at least one light emitting element; and
the lateral light reflecting layer being positioned in between the lateral light absorbing layer and the at least one light emitting element.

5. The light emitting structure as claimed in claim 1 comprising:
at least one portion of the divider being transparent.

6. The light emitting structure as claimed in claim 1 comprising:
the light guide element being integrated with the divider.

7. The light emitting structure as claimed in claim 1 comprising:
the external surface and/or the internal surface being an uneven surface.

8. The light emitting structure as claimed in claim 1 comprising:
the light guide element comprising a plurality of blind holes; and
the plurality of blind holes traversing into the external surface and/or the internal surface.

9. The light emitting structure as claimed in claim 1 comprising:
a thickness of the light guide element at a periphery of the light guide element being smaller than a thickness of the light guide element at a center of the light guide element.

10. The light emitting structure as claimed in claim 1 comprising:
the light guide element comprising at least one conical section, the at least one convex section and the at least one concave section;
the at least one conical section comprising a plurality of conical sections;
the at least one convex section comprising a plurality of convex sections;
the at least one concave section comprising a plurality of concave sections; and
the light guide element having a shape of multiple concentric volcano craters or a shape of a speaker drum or a shape of multiple ring waves by the plurality of conical sections, the plurality of convex sections and the plurality of concave sections being formed on the external surface and the internal surface.

11. The light emitting structure as claimed in claim 10 comprising:
the plurality of conical sections comprising a first conical section and a second conical section;
the plurality of convex sections comprising a first annular convex section, a second annular convex section and a central convex section;
the plurality of concave sections comprising a first annular concave section, a central concave section and a second annular concave section;
the first conical section, the first annular concave section, the first annular convex section and the central concave section being concentrically and sequentially formed on the external surface from a periphery of the light guide element towards a center of the light guide element;
the second conical section, the second annular convex section, the second annular concave section and the central convex section being concentrically and sequentially formed on the internal surface from the periphery of the light guide element towards the center of the light guide element;
the first conical section and the second conical section being oppositely positioned to each other;
the first conical section and the second conical section each being obliquely extended from the periphery of the light guide element towards the center of the light guide element;
the first annular concave section and the second annular convex section being oppositely positioned to each other;
the first annular convex section and the second annular concave section being oppositely positioned to each other; and
the central concave section and the central convex section being oppositely positioned to each other.

12. The light emitting structure as claimed in claim 11 comprising:
the light guide element comprising at least one substantial flat section;
the at least one substantial flat section comprising a plurality of substantial flat sections;
the plurality of substantial flat sections comprising a first substantial flat section and a second substantial flat section;
the first substantial flat section, the first conical section, the first annular concave section, the first annular convex section and the central concave section being concentrically and sequentially formed on the external surface from the periphery of the light guide element towards the center of the light guide element;
the second substantial flat section, the second conical section, the second annular convex section, the second annular concave section and the central convex section being concentrically and sequentially formed on the internal surface from the periphery of the light guide element towards the center of the light guide element;
the first substantial flat section and the second substantial flat section being oppositely positioned to each other; and
the second substantial flat section being connected with the divider.

13. The light emitting structure as claimed in claim 1 comprising:
 the light guide element comprising the at least one convex section and the at least one concave section;
 the at least one convex section and the at least one concave section being correspondingly positioned to the at least one light emitting element; and
 the at least one convex section and the at least one concave section being offset from the at least one light emitting element.

14. The light emitting structure as claimed in claim 1 comprising:
 the light guide element comprising the at least one convex section or the at least one concave section; and
 the at least one convex section or the at least one concave section being formed on the external surface or the internal surface.

15. The light emitting structure as claimed in claim 14 comprising:
 the at least one convex section or the at least one concave section being correspondingly positioned to the divider; and
 the at least one convex section or the at least one concave section being offset from the divider.

16. The light emitting structure as claimed in claim 14 comprising:
 the at least one convex section or the at least one concave section being correspondingly positioned to the at least one light emitting element; and
 the at least one convex section or the at least one concave section being offset from the at least one light emitting element.

17. The light emitting structure as claimed in claim 14 comprising:
 a coating; and
 the coating being disposed on the at least one convex section or the at least one concave section.

18. The light emitting structure as claimed in claim 1 comprising:
 the at least one light emitting element comprising a primary light emitting surface and a mounting surface;
 the primary light emitting surface and the mounting surface being oppositely positioned to each other;
 the primary light emitting surface facing towards the light guide element; and
 the mounting surface being mounted onto the substrate.

19. The light emitting structure as claimed in claim 18 comprising:
 the at least one light emitting element comprising a secondary light emitting surface;
 the secondary light emitting surface and the primary light emitting surface being adjacently positioned to each other;
 the secondary light emitting surface and the mounting surface being adjacently positioned to each other;
 the secondary light emitting surface being positioned in between the primary light emitting surface and the mounting surface; and
 the secondary light emitting surface facing towards the divider.

20. The light emitting structure as claimed in claim 1 comprising:
 the at least one light emitting element comprising a primary light emitting surface and a mounting surface;
 the primary light emitting surface and the mounting surface being adjacently positioned to each other;
 the primary light emitting surface facing towards the divider; and
 the mounting surface being mounted onto the substrate.

21. The light emitting structure as claimed in claim 20 comprising:
 the at least one light emitting element comprising a secondary light emitting surface;
 the secondary light emitting surface and the primary light emitting surface being adjacently positioned to each other;
 the secondary light emitting surface and the mounting surface being oppositely positioned to each other; and
 the secondary light emitting surface facing towards the light guide element.

22. The light emitting structure as claimed in claim 1 comprising:
 the at least one light emitting element comprising a plurality of light emitting elements.

23. The light emitting structure as claimed in claim 1 comprising:
 the at least one light emitting element comprising two light emitting elements;
 the two light emitting elements each comprising a primary light emitting surface and a mounting surface, the primary light emitting surface and the mounting surface being adjacently positioned to each other;
 the two primary light emitting surfaces each facing towards the divider;
 the two primary light emitting surfaces being oriented in two opposite directions; and
 the two mounting surfaces each being mounted onto the substrate.

24. The light emitting structure as claimed in claim 1 comprising:
 the at least one light emitting element being a top emitting LED.

25. The light emitting structure as claimed in claim 1 comprising:
 the at least one light emitting element being a side emitting LED.

26. The light emitting structure as claimed in claim 1 comprising:
 the at least one light emitting element being electrically connected with the substrate.

27. The light emitting structure as claimed in claim 1 comprising:
 at least one electrical node; and
 the at least one light emitting element being mounted onto the substrate via the at least one electrical node.

28. The light emitting structure as claimed in claim 1 comprising:
 a bottom light reflecting layer; and
 the bottom light reflecting layer being superposed onto the substrate.

29. The light emitting structure as claimed in claim 28 comprising:
 the bottom light reflecting layer being coated on the substrate.

30. The light emitting structure as claimed in claim 28 comprising:
 the bottom light reflecting layer being accommodated within the chamber.

31. The light emitting structure as claimed in claim 28 comprising:
 the bottom light reflecting layer comprising a white color ink.

32. The light emitting structure as claimed in claim 28 comprising:
   the bottom light reflecting layer comprising a reflecting material; and
   the reflecting material being configured to achieve reflecting efficiency for red color band in a range between 520 nm and 540 nm and green color band in a range between 620 nm and 660 nm.

33. The light emitting structure as claimed in claim 1 comprising:
   a first light diffusing film;
   the first light diffusing film being disposed on the light guide element; and
   the light guide element being positioned in between the divider and the first light diffusing film.

34. The light emitting structure as claimed in claim 33 comprising:
   a first brightness enhancement film;
   the first brightness enhancement film being disposed on the first light diffusing film; and
   the first light diffusing film being positioned in between the light guide element and the first brightness enhancement film.

35. The light emitting structure as claimed in claim 34 comprising:
   a light converting film;
   the light converting film being disposed on the first brightness enhancement film; and
   the first brightness enhancement film being positioned in between the first light diffusing film and the light converting film.

36. The light emitting structure as claimed in claim 35 comprising:
   a second light diffusing film;
   the second light diffusing film being disposed on the light converting film; and
   the light converting film being positioned in between the first brightness enhancement film and the second light diffusing film.

37. The light emitting structure as claimed in claim 36 comprising:
   a second brightness enhancement film;
   the second brightness enhancement film being disposed on the second light diffusing film; and
   the second light diffusing film being positioned in between the light converting film and the second brightness enhancement film.

38. The light emitting structure as claimed in claim 35 comprising:
   the light converting film comprising a light conversion material; and
   a light wavelength of the light conversion material being in a range between 525 nm and 538 nm.

39. The light emitting structure as claimed in claim 1 comprising:
   the at least one light emitting element comprising a light conversion material; and
   a light wavelength of the light conversion material being in a range between 630 nm and 660 nm.

* * * * *